United States Patent Office 3,423,450
Patented Jan. 21, 1969

3,423,450
PROCESS FOR PREPARING AROMATIC POLYISOCYANATES
Emmett H. Burk, Jr., Glenwood, Ill., and Donald D. Carlos, Crown Point, Ind., assignors to Sinclair Research, Inc., New York, N.Y., a corporation of Delaware
No Drawing. Filed Oct. 22, 1965, Ser. No. 502,566
U.S. Cl. 260—453                                14 Claims
Int. Cl. C07c *119/04;* C07d *95/00*

ABSTRACT OF THE DISCLOSURE

Aromatic polyisocyanates are prepared by subjecting to thermal decomposition a cyclic nitrile sulfite which is free of chlorine-containing impurities and which has the structure:

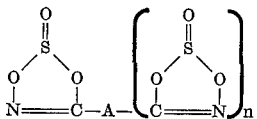

wherein A is aromatic hydrocarbon of 1 to 3 aromatic hydrocarbon rings and $n$ is an integer of 1 to 3. Preferably, A contains 6 to about 20 carbon atoms and $n$ is 1 or 2.

---

The present invention is directed to a process for the production of aromatic polyisocyanates including aromatic diisocyanates. More specifically, the invention is directed to the production of polyisocyanates by the thermal decomposition of aromatic poly(nitrile sulfites), including aromatic di(nitrile sulfites).

Polyisocyanates such as diisocyanates have found extensive use in the preparation of high molecular weight polymers by reaction of the polyisocyanates with polymerizable organic compounds such as compounds with terminal, active hydroxy and amine groups. Polyurethanes, for instance, are commonly prepared by the reaction of diisocyanates and polyhydroxy alcohols such as the glycols.

The aromatic poly(nitrile sulfites) which decompose to the corresponding aromatic polyisocyanates in accordance with the process of the present invention, can be represented by the following structure:

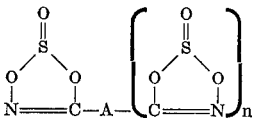

wherein A is an aromatic hydrocarbon of 1 to 3 aromatic hydrocarbon rings often of 6 to about 20 carbon atoms, preferably 6 to about 10 carbon atoms and $n$ is an integer of 1 to 3, preferably 1 to 2. The aromatic hydrocarbon, A, in the above structure, can also be substituted with non-interfering groups. At least two of the nitrile groups of the compounds of the present invention are attached to aromatic rings of the aromatic hydrocarbon A, and the nitrile sulfite groups may be attached to the same or different aromatic rings of aromatic hydrocarbon A. Thus, the novel compounds of the invention include the poly (nitrile sulfites) of for instance, benzene, toluene, naphthalene, anthracene, phenylbenzene, phenylnaphthalene, diphenylalkylenes such as diphenylmethylene, diphenylethylene (stilbene), etc., dinaphthylalkylene and the like aromatic hydrocarbons.

Aromatic poly(nitrile sulfites) that can be used as the feed in the method of the present invention can be prepared for instance by the method described in co-pending application Ser. No. 471,714 to Emmett H. Burk and Donald D. Carlos filed July 13, 1965, now Patent No. 3,268,542. Illustrative of suitable feeds are benzodi(nitrile sulfites), preferably those wherein the nitrile sulfite groups are in the non-ortho-position on the benzene ring, i.e., the meta and para position such as isophthalodi(nitrile sulfite) and terephthalodi(nitrile sulfite), benzotri(nitrile sulfites) such as 1,3,5-benzotri(nitrile sulfite); benzotetra-(nitrile sulfites) such as pyromellitotetra(nitrile sulfite) and prehnitrotetra(nitrile sulfite); 2,4 di(nitrile sulfite)-m-xylene; 2,5-di(nitrile sulfite)-p-xylene; 1,4-di(nitrile sulfite)-o-xylene; 2,4-di(nitrile sulfite)-1-methylbenzene; 2,4-di(nitrile sulfite)-1-ethylbenzene; 1,3,5-tri(nitrile sulfite)-2-ethylbenzene; 1,4-di(nitrile sulfite)-2-nonylbenzene; 2,4-di(nitrile sulfite)-6-tricosylbenzene; 1,3,5-tri(nitrile sulfite)-6-hexacosylbenzene; 1,3-di(nitrile sulfite)-5-benzylbenzene; 1-[2,4-di(nitrile sulfite)]-2-phenyl propane; 2,8-di(nitrile sulfite) naphthalene; 1,3,5-tri(nitrile sulfite) naphthalene; 1,3-di(nitrile sulfite) tetrahydronaphthalene; 2,2-bis[p-di(nitrile sulfite) phenyl] propane; bis[p-di(nitrile sulfite) phenyl] methane; 1-chloro-3,5-di-(nitrile sulfite) benzene; 4-bromo-1,3,5-tri(nitrile sulfite) benzene; 3-nitro-1,4-di(nitrile sulfite) benzene; 2,8-di(nitrile sulfite) anthracene; 2,5,8-tri(nitrile sulfite) anthracene, 4,4'-biphenyl di(nitrile sulfite); 2,2'-biphenyl di-(nitrile sulfite); 4,4'-diphenylethane di(nitrile sulfite); 2,2'-diphenylethane di(nitrile sulfite); 4,4'-stilbene di(nitrile sulfite); 2,2'-stilbene di(nitrile sulfite).

Decomposition of the aromatic poly (nitrile sulfite) to the corresponding aromatic polyisocyanates can be effected by heating the aromatic poly(nitrile sulfites) to a temperature below the degradation point of the desired aromatic polyisocyanate product. Since the decomposition reaction is exothermic there may be a tendency for the reaction temperature to run away. Means for carrying away or absorbing heat may be used, therefore, to control the temperature below the degradation point of the desired aromatic polyisocyanate product. The temperature employed will vary, of course, depending on the decomposition temperature of the feed and degradation temperature of the particular aromatic polyisocyanates being prepared. In most cases, however, temperature will usually fall in the range of about 50 to 200° C., preferably about 75 to 150° C. Advantageously, the decomposition is conducted in the presence of an inert solvent such as benzene, xylene, toluene, chlorobenzene and the like or in thionyl chloride.

The ability of the aromatic poly(nitrile sulfites) to generate polyisocyanates upon heating provides an additional advantage to the consumer in that the aromatic poly(nitrile sulfites), in contrast to isocyanates, are stable in the absence of water and therefore can be easily handled and stored. Also, since there is no active hydrogen (e.g., in the form of HCl) present in the aromatic poly(nitrile sulfites) or in the decomposition products formed, to react with the isocyanate when the latter is made, use of the aromatic poly(nitrile sulfites) for the production of polyisocyanates provides a method that does not suffer from the reduced yields and separation and purification problems presented by the by-products obtained from starting materials of commercial methods wherein active hydrogen is present. Use of the aromatic poly(nitrile sulfites) in the preparation of isocyanates, furthermore, provides a process having advantages over commercial methods employing azides in that the former do not have the explosion tendencies of the latter and are more economical.

The aromatic poly(nitrile sulfites) can be prepared by reacting an aromatic polyhydroxamic acid and thionyl chloride. Aromatic polyhydroxamic acids which react with thionyl chloride to produce the aromatic poly(nitrile sulfites) can be represented by the structure:

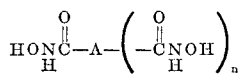

wherein A and n are as defined above in the structure of the aromatic poly(nitrile sulfite) and preferably wherein the hydroxamic acid groups are in a non-ortho-position on the aromatic ring. Thus, the aromatic poly hydroxamic acid reactants include, for instance, benzopolyhydroxamic acids, naphthopolyhydroxamic acids, anthropolyhydroxamic acids, phenylbenzopolyhydroxamic acids, phenylnaphthopolyhydroxamic acid, diphenylalkylene polyhydroxamic acids and dinaphthylalkylene polyhydroxamic acids. The aromatic hydrocarbon, A, of the polyhydroxamic acid structure can be substituted, if desired, so long as the substituents do not inhibit formation of the poly(nitrile sulfites) of the invention.

Illustrative of aromatic polyhydroxamic acids suitable for use as the reactant in the preparation of the aromatic poly(nitrile sulfites) are the following: benzodihydroxamic acids, such as isophthalodihydroxamic acid and terephthalodihydroxamic acid; benzotrihydroxamic acid, such as 1,3,5-benzenetrihydroxamic acid; benzotetrahydroxamic acid, such as pyromellitohydroxamic acid, prehnitrotetrahydroxamic acid; 1,4-dimethyl-2, 5-benzodihydroxamic acid; 1,3-dimethyl - 2,4 - benzodihydroxamic acid; 2,3-dimethyl-1,5-benzodihydroxamic acid; methylbenzodihydroxamic acid; methylbenzotrihydroxamic acid; ethylbenzodihydroxamic acid, ethylbenzotrihydroxamic acid; hexylbenzodihydroxamic acid; hexylisophthalodihydroxamic acid; nonylbenzodihydroxamic acid; dodecylbenzotrihydroxamic acid; pentadecylterephthalodihydroxamic acid; pentadecylterephthalotrihydroxamic acid; tricosylterephthalodihydroxamic acid; tricosylterephthalotrihydroxamic acid; 1-benzyl-2, 4-benzodihydroxamic acid; 2,8-naphthodihydroxamic acid; 1,3,5-naphthotriyhydroxamic acid; cyclohexylterephthalodihydroxamic acid; tetrahydronaphthalodihydroxamic acid; 2,2 bis (p-phenylhydroxamic acid) propane; bis (p-phenylhydroxamic acid) methane, 1-chloroisothalodihydroxamic acid; 4-bromo-1,3,5-trihydroxamic acid; 3-nitroterephthalodihydroxamic acid; 2,8-anthracenetrihydroxamic acid; 4,4$^1$-biphenyldihydroxamic acid; 2,2$^1$-biphenyldihydroxamic acid; 4,4$^1$-diphenylethanedihydroxamic acid; 2,2$^1$-diphenylethanedihydroxamic acid; 4,4$^1$-stilbenedihydroxamic acid; 2,2$^1$-stilbenedihydroxamic acid.

The temperature for effecting the reaction of the aromatic hydroxamic acid and thionyl chloride may vary depending upon the particular aromatic hydroxamic acid selected but in all cases should be conducted below the decomposition temperature of the desired aromatic nitrile sulfite. Reflux temperatures can also be used as long as the reflux temperature of the particular mixture is below the decomposition temperature of the corresponding aromatic nitrile sulfite produced. The reaction temperature will often fall in the range of up to about 90° C., preferably up to about 50° C. The reaction has been successfully run at temperatures as low as about minus 30° C. Ordinarily the reaction will proceed readily at atmospheric pressure but sub- and superatmospheric pressure can be employed, if desired.

Either the polyhydroxamic acid reactant or the thionyl chloride reactant can be in excess but it is preferred that at least a stoichiometric amount of thionyl chloride be used, that is, a ratio of at least one mole of thionyl chloride per hydroxamic acid substituent. A large excess of thionyl chloride is particularly preferred. The reaction can be conducted in the liquid phase and in many cases the aromatic poly (hydroxamic acid) will react from the solid state. Advantageously the aromatic poly (hydroxamic acid) is first dissolved or slurried in an oxygen-containing organic solvent. Illustrative of suitable oxygen-containing solvents are the thionyl chloride reactant itself and normally liquid organic ethers, esters, furans, dioxanes and the like. The preferred solvent is the thionyl chloride reactant, an excess of which will partially dissolve the aromatic poly (hydroxamic acid).

The reaction is often over in less than about 0.5 hour, for example, 15 minutes or in about 5 to 20 hours, depending upon the reaction temperature employed and is marked by a cessation in hydrogen chloride gas evolution. Normally at least about 0.5 hour is required for the reaction to go to completion at temperatures which minimize side reactions. The reaction is usually quite rapid as the aromatic poly (hydroxamic acid) is dissolved. At the lower reaction temperatures the aromatic poly (hydroxamic acid) is generally slow to dissolve and may even come out of solution, go back into solution, etc., during the reaction.

The aromatic nitrile sulfite can be recovered from the resulting solution by any desirable means, for instance, by first filtering the resulting solution to remove any unreacted starting materials and subjecting the filtrate to reduced pressure to remove unreacted thionyl chloride and inert solvent, if employed, and provide the aromatic nitrile sulfite as a crude product. Alternatively, prior to the filtering step, the solution can be cooled to crystallize out the product which is then recovered as described. The crude product which can be either crystalline or liquid depending on the particular aromatic poly (nitrile sulfite) prepared, contains small amounts of impurities high in chlorine content. A purer product, essentially chlorine-free, can be obtained by recrystallization techniques as, for instance, from a suitable solvent such as dichloromethane, carbon disulfide, ethyl acetate, thionyl chloride and the like, or mixtures thereof.

A convenient alternative method for obtaining an essentially chlorine-free aromatic poly(nitrile sulfite) is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular aromatic poly (nitrile sulfite) feed selected. If desired, a combination of both the recrystallization and extraction methods can be used to obtain essentially chlorine-free aromatic poly(nitrile sulfite). Thermal decomposition of the essentially chlorine-free feed in accordance with the method of the present invention results in improved yields of a purer isocyanate product, which is also essentially chlorine-free.

When crude meta aromatic poly(nitrile sulfite) is extracted with hydrocarbon solvent there is obtained a pale yellow oil in amounts that usually represents about 3 to 5% of the original charge of aromatic polyhydroxamic acids employed in the preparation of the aromatic poly (nitrile sulfite). Infra-red examination of the oil indicates the presence of trace amounts of isocyanate, moderate amounts of sulfite and chlorine groups and at least two different kinds of carbonyl groups. Although the identity of the materials that make up the impurities is not known for certain, it is believed that the impurity is made up in large part of aromatic chlorosulfites. No such oil has been obtained from the extraction of crude para-aromatic poly (nitrile sulfite) indicating that the impurities in crude para-aromatic nitrile sulfite are apparently of a different form.

The following examples will serve to illustrate preparation of the aromatic poly(nitrile sulfites) feed of the present invention.

EXAMPLE I

Preparation of isophthalodi(nitrile sulfite)

To a 300 cc. fluted, round bottom flask equipped with a reflux condenser attached to a CaCl$_2$ drying tube, is added 9.8 g. (0.050 mole) of isophthalodihydroxamic acid and 165 g. (1.35 moles) of thionyl chloride. The reaction mixture was stirred mechanically and heated to a maximum temperature of 45° C. for one hour. The resulting solution was filtered and the thionyl chloride removed under reduced pressure. There was obtained 14.4 g. of an isophthalodi(nitrile sulfite) product containing small amounts of impurities and having a melting point of 104–107° C. Recrystallization from carbon disulfide gave white crystals having a melting point of 118–119° C.

*Analysis.*—Calcd. for $C_8H_4N_2O_6S_2$: C, 33.33%; H, 1.40%; N, 9.72%; S, 22.25%. Found: C, 34.03%; H, 1.54%; N, 9.32%; S, 22.00%.

The infrared spectrum (Nujol mull) of the recrystallized material was determined and showed a significant absorption peak at 6.22 microns, characteristic of conjugated C=N stretching vibrations, and a significant band in the 8.17 micron region characteristic of cyclic sulfites.

EXAMPLE II

Preparation of terephthalodi(nitrile sulfite)

To a 300 cc. fluted, round bottom flask equipped with a reflux condenser attached to a $CaCl_2$ drying tube, were added 9.8 g. (0.050 mole) of a terephthalodihydroxamic acid and 121 g. (1.01 moles) of thionyl chloride. The reaction mixture was stirred mechanically and heated to a maximum temperature of 45° C. for two hours. The resulting solution was filtered and the thionyl chloride removed under reduced pressure. There resulted 14.2 g. (99%) of terephthalodi(nitrile sulfite) containing small amounts of impurities and having a melting point of 139° C. (dec.). Recrystallization from dichloromethane gave white crystals, M.P. 143° C. (dec.).

*Analysis.*—Calculated for $C_8H_4N_2O_6S_2$: C, 33.33%; H, 1.40%; N, 9.72%; S, 22.25%. Found: C, 33.72%; H, 1.54%; N, 9.10%; S, 22.30%.

The infrared spectrum (Nujol mull) of the recrystallized material showed a significant band at 6.22 microns, characteristic of a conjugated C=N stretching vibration, and significant absorption in the 8.06 micron region characteristic of cyclic sulfites.

EXAMPLE III

Fifty grams of an 85:15 mixture of isophthalodihydroxamic acid and terephthalodihydroxamic acid were added to 298 g. of thionyl chloride at room temperature with mechanical stirring. The mixture was warmed to 45° C. where the solid dissolved almost completely and vigorous gas evolution was noted. After one hour at 45° C. and removal by filtration of a small amount of insoluble matter, the filtrate was chilled at −10° C. for several hours. Filtration of the cold mixture afforded 40 g. (52%) of a mixture of iso- and terephthalodi(nitrile sulfites), M.P. (dec.) 105–107° C. A second crop of less pure disulfites was obtained by complete evaporation of the thionyl chloride: 30.5 g., M.P. (dec.) 95–98° C. Total yield, 91.5%.

The following examples are presented to illustrate preparation of aromatic polyisocyanates in accordance with the method of the present invention but are not to be considered as limiting.

EXAMPLE IV

To a one-liter flask equipped with stirrer and condenser was added, at room temperature, 350 g. of chlorobenzene and 59 g. of chlorine-free mixed m- and p-phenylenedi-(nitrile sulfite) obtained by recrystallization from thionyl chloride, of crude mixed m- and p-phenylenedi(nitrile sulfites) prepared according to the procedure of Example III. The heterogeneous mixture was warmed slowly. At about 55° C. all of the solid had dissolved and warming was continued. At about 95° C. rapid gas evolution began and the heat was removed. The exothermic reaction mixture reached a maximum temperature of 125° C. A recovery of 235 g. (90%) of sulfur dioxide was removed at reduced pressure before a chlorobenzene-phenylene diisocyanate fraction was collected and infrared analysis of that solution indicated the presence of 32.2 g. (98%) of phenylene diisocyanate. A pot residue of 1.0 g. was obtained in the distillation.

EXAMPLE V

Decomposition in the manner described in Example IV above of a sample of phenylene di(nitrile sulfite) obtained by recrystallization of a crude sample in ethyl acetate, provided an 89% yield of chlorine-free phenylene diisocyanate. A pot residue representing 11% of diisocyanate expected was obtained.

EXAMPLE VI 216 grams of crude phenylenedi(nitrile sulfite) was extracted with 500 ml. of pentane. The extract yielded a pale yellow oil upon evaporation in an amount of about 5% of the original charge of aromatic dihydroxamic acid employed in the preparation of the disulfite. Elemental analysis of the pale yellow oil gave the following results:

| | Percent |
|---|---|
| Cl | 15.5 |
| S | 13.9 |
| C | 38.41 |
| H | 2.19 |
| N (questionable) | 5.97 |

An NMR spectrum of the oil did not indicate the presence of non-aromatic protons. Thermal decomposition of the oil in chlorobenzene yielded a greater amount of sulfur dioxide than could be accounted for by the increase in isocyanate. A similar oil was obtained from the mother liquor of the recrystallization of the crude phenylenedi-(nitrile sulfite) in ethyl acetate.

Decomposition of the pentane-washed phenylene di-(nitrile sulfite) gave approximately 89% yield of an essentially chlorine-free phenylene diisocyanate, and a pot residue representing approximately 11% of diisocyanate.

EXAMPLE VII

To a 500 cc. round bottom flash equipped with a glass bead column, was added 250 cc. of chlorobenzene and the solvent heated to a reflux. A sample of 50 g. (0.17 mole) of chlorine-free isophthalodi(nitrile sulfite) obtained by pentane washing crude isophthalodi(nitrile sulfite) prepared by the general method of Example I was introduced into an extraction chamber attached to the reaction assembly. The overhead chlorobenzene vapors were condensed on a cold finger and the condensate permitted to pass through the extraction chamber and on into the heated glass bead column. At this point decomposition took place and the higher boiling diisocyante was concentrated in the pot while the gaseous $SO_2$ was taken overhead. This extraction process was allowed to continue for about three hours, at the end of which time 3.9 g. of residue was left in the extraction chamber. The pot mixture was transferred to a distillation apparatus and the chlorobenzene removed under reduced pressure. Upon further distillation there was obtained 23.8 g. (91% based on reacted starting material) of m-phenylenediisocyanate, B.P. 109° C. at 8 mm. of Hg pressure.

The infrared spectrum (Nujol mull) of the diisocyanate, M.P. 51–52° C., was determined and showed a significant band at 4.47 microns characteristic of aromatic isocyanate absorption.

EXAMPLE VIII

In a similar manner, 12.2 g. (0.0424 mole) of chlorine-free terephthalodi(nitrile sulfite) obtained by pentane washing crude terephthalodi(nitrile sulfite) prepared by the general method of Example I, was decomposed in 250 cc. chlorobenzene over a three hour period, at the end of which time, 2.4 g. of residue was left in the extraction chamber. The chlorobenzene was removed under reduced pressure and upon further distillation there was obtained 4.9 g. (91% based on reacted starting material)

of chlorine-free p-phenylenediisocyanate, B.P. 122–123° C. at 15 mm. of Hg pressure.

The infrared spectrum (Nujol mull) of the diisocyanate, M.P. 93–94° C., was determined and showed a strong characteristic isocyanate peak at 4.48 microns.

EXAMPLE IX 300 grams of isophalodihydroxamic acid and 1910 grams of thionyl chloride were heated to a maximum temperature of 45° C. for one hour. The resulting solution containing phenylene-di(nitrile sulfite) in excess thionyl chloride, was added dropwise during six hours to 700 ml. of refluxing chlorobenzene in a stirred pot. Pot temperature was 113–133° C. Vapors from the pot were passed through a column at 75–80° C. permitting passage of thionyl chloride while condensing chlorobenzene. Vapors passing through the tube were condensed and collected. In this way, phenylenedi(nitrile sulfite) in thionyl chloride solution was decomposed as thionyl chloride was removed. The final pot solution was brought briefly to its boiling point. Fractional distillation provided a 48% yield of diisocyanate. A pot residue was obtained representing 43% of expected diisocyanate. A 90% recovery of sulfur dioxide was made.

The relatively low yield of diisocyanate obtained in this example illustrates the bad effects of the chlorine impurity in the aromatic di(nitrile sulfite) decomposed.

It is claimed:

1. A process for the production of aromatic polyisocyanates which consists essentially of subjecting to thermal decomposition, at a temperature below the degradation point of the desired isocyanate, an aromatic poly(nitrile sulfite) compound which is essentially free of chlorine-containing impurities and which has the structure:

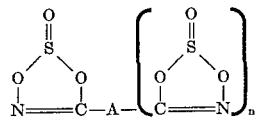

wherein A is aromatic hydrocarbon of 1 to 3 aromatic hydrocarbon rings and $n$ is an integer of 1 to 3.

2. The process of claim 1 wherein A in the compound contains 6 to about 20 carbon atoms.

3. The process of claim 1 wherein $n$ is 1.

4. The process of claim 1 wherein the aromatic poly(nitrile sulfite) compound subjected to the decomposition is terephthalodi(nitrile sulfite) and the aromatic polyisocyanate produced thereby is p-phenylene diisocyanate.

5. The process of claim 1 wherein the aromatic poly(nitrile sulfite) compound subjected to the decomposition is isophthalodi(nitrile sulfite) and the aromatic polyisocyanate produced thereby is m-phenylene diisocyanate.

6. The process of claim 1 wherein the aromatic poly(nitrile sulfite) compound has the structure:

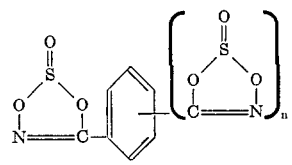

wherein $n$ is an integer of 1 to 3.

7. The process of claim 6 wherein $n$ is an integer of 1 or 2 and the cyclic nitrile sulfite groups occupy other than ortho positions on the benzene ring.

8. A method for the preparation of aromatic polyisocyanates which consists essentially of reacting thionyl chloride and an aromatic polyhydroxamic acid having the structure:

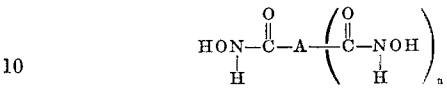

wherein A is an aromatic hydrocarbon of 1 to 3 aromatic hydrocarbon rings and $n$ is an integer of 1 to 3, separating from the resulting reaction product mixture an aromatic poly(nitrile sulfite) which is essentially free of chlorine-containing impurities and which has the structure:

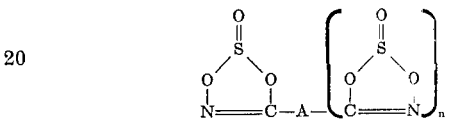

wherein A and $n$ correspond to that of said aromatic polyhydroxamic acid, and subjecting said aromatic poly(nitrile sulfite) to thermal decomposition, at a temperature below the degradation point of the desired isocyanate, to provide the corresponding aromatic polyisocyanate.

9. The process of claim 8 wherein A contains 6 to about 20 carbon atoms.

10. The process of claim 8 wherein $n$ is 1.

11. The process of claim 8 wherein the aromatic polyhydroxamic acid has the structure:

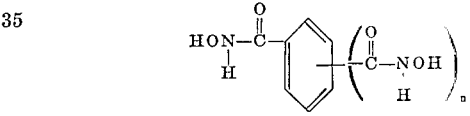

wherein $n$ is an integer of 1 to 3.

12. The process of claim 11 wherein $n$ is an integer of 1 or 2 and the hydroxamic acid groups occupy other than ortho positions on the benzene ring.

13. The process of claim 11 wherein the aromatic polyhydroxamic acid is terephthalodihydroxamic acid.

14. The process of claim 11 wherein the aromatic polyhydroxamic acid is isophthalodihydroxamic acid.

References Cited

UNITED STATES PATENTS

| | | | |
|---|---|---|---|
| 2,394,597 | 2/1946 | Dickey et al. | 260—453 |
| 3,238,220 | 3/1966 | Boshagen | 260—301 XR |
| 3,268,542 | 8/1966 | Burk et al. | 260—453 XR |

OTHER REFERENCES

Marquis: Compt. Rend. vol. 143 pp. 1163–5 (1906).

CHARLES B. PARKER, *Primary Examiner.*

DOLPH H. TORRENCE, *Assistant Examiner.*

U.S. Cl. X.R.

260—301